United States Patent
Shiojiri

(12) 
(10) Patent No.: US 6,275,534 B1
(45) Date of Patent: Aug. 14, 2001

(54) MOVING PICTURE TRANSMISSION SYSTEM AND MOVING PICTURE TRANSMISSION APPARATUS USED THEREIN

(75) Inventor: Hirohisa Shiojiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/044,006

(22) Filed: Mar. 19, 1998

(30) Foreign Application Priority Data

Mar. 19, 1997 (JP) .................................................... 9-065234

(51) Int. Cl.⁷ ........................................................ H04N 7/18
(52) U.S. Cl. .............................. 375/240.25; 375/240.26; 375/240.29
(58) Field of Search .......................... 375/240.01–240.29; 348/845.1, 845.2, 845.3, 384, 388, 390, 392, 394, 398, 397, 404, 405, 407, 419, 420, 423, 461, 462, 463, 464, 465

(56) References Cited

U.S. PATENT DOCUMENTS

| | | | |
|---|---|---|---|
| 4,305,131 | 12/1981 | Best | 364/521 |
| 4,636,848 | 1/1987 | Yamamoto | 358/102 |
| 4,724,495 | 2/1988 | Hedberg et al. | 360/22 |

(List continued on next page.)

FOREIGN PATENT DOCUMENTS

| | | |
|---|---|---|
| 59-204346 | 11/1984 | (JP) . |
| 61-123280 | 6/1986 | (JP) . |
| 63-73786 | 4/1988 | (JP) . |
| 2-15791 | 1/1990 | (JP) . |
| 2-20988 | 1/1990 | (JP) . |
| 2-113748 | 4/1990 | (JP) . |
| 2-162464 | 6/1990 | (JP) . |
| 2-204865 | 8/1990 | (JP) . |
| 2-204964 | 8/1990 | (JP) . |
| 3-18976 | 1/1991 | (JP) . |
| 3-22780 | 1/1991 | (JP) . |
| 3-66228 | 3/1991 | (JP) . |
| 4-100494 | 4/1992 | (JP) . |
| 4-207876 | 6/1992 | (JP) . |
| 4-207877 | 7/1992 | (JP) . |
| 4-330881 | 11/1992 | (JP) . |
| 4-345284 | 12/1992 | (JP) . |
| 4-345486 | 12/1992 | (JP) . |
| 5-30464 | 2/1993 | (JP) . |
| 5-183863 | 7/1993 | (JP) . |
| 5-244423 | 9/1993 | (JP) . |
| 5-260431 | 10/1993 | (JP) . |
| 6-162116 | 6/1994 | (JP) . |
| 6-187379 | 7/1994 | (JP) . |
| 6-318256 | 11/1994 | (JP) . |
| 6-339130 | 12/1994 | (JP) . |
| 7-46517 | 2/1995 | (JP) . |
| 7-98965 | 4/1995 | (JP) . |
| 7-135512 | 5/1995 | (JP) . |
| 8-46960 | 2/1996 | (JP) . |
| 8-79674 | 3/1996 | (JP) . |
| 8-101845 | 4/1996 | (JP) . |
| 8-172592 | 7/1996 | (JP) . |
| 8-223556 | 8/1996 | (JP) . |
| 9-84007 | 3/1997 | (JP) . |
| 10-13826 | 1/1998 | (JP) . |

*Primary Examiner*—Anand Rao
(74) *Attorney, Agent, or Firm*—Sughrue, Mion, Zinn, Macpeak & Seas, PLLC

(57) ABSTRACT

A moving picture transmission system includes a transmission apparatus and a reception apparatus. The transmission apparatus transmits a maximum number of pieces of information obtained by hierarchically coding moving picture information in accordance with degrees of importance in terms of image quality within a moving picture frame period in the order of decreasing degrees of importance. The reception apparatus reproduces a moving picture frame in accordance with only hierarchically coded information received at a moving picture frame period. A moving picture transmission apparatus is also disclosed.

5 Claims, 7 Drawing Sheets

U.S. PATENT DOCUMENTS

| | | | |
|---|---|---|---|
| 4,729,043 | 3/1988 | Worth | 358/342 |
| 4,760,390 | 7/1988 | Maine et al. | 340/747 |
| 4,876,597 | 10/1989 | Roy et al. | 358/141 |
| 4,924,303 | 5/1990 | Brandon et al. | 358/147 |
| 4,970,716 | 11/1990 | Goto et al. | 370/58.1 |
| 5,003,390 | 3/1991 | Helgert et al. | 358/142 |
| 5,006,936 | 4/1991 | Hooks, Jr. | 358/335 |
| 5,010,499 | 4/1991 | Yee | 364/521 |
| 5,047,977 | 9/1991 | Hill et al. | 364/900 |
| 5,065,345 | 11/1991 | Knowles et al. | 395/154 |
| 5,067,015 | 11/1991 | Combridge et al. | 358/133 |
| 5,133,079 | 7/1992 | Ballantyne et al. | 455/4.1 |
| 5,136,395 | 8/1992 | Ishii et al. | 358/335 |
| 5,140,417 | 8/1992 | Tanaka et al. | 358/133 |
| 5,270,813 | 12/1993 | Puri et al. | 358/136 |
| 5,461,619 * | 10/1995 | Citta et al. | 348/423 |
| 5,502,571 * | 3/1996 | Decotignie et al. | 348/388 |
| 5,734,677 * | 3/1998 | Liew et al. | 348/420 |
| 5,796,743 * | 8/1998 | Bunting et al. | 348/384 |

\* cited by examiner

MOVING PICTURE TRANSMISSION SYSTEM AND MOVING PICTURE TRANSMISSION APPARATUS USED THEREIN

BACKGROUND OF THE INVENTION

The present invention relates to a moving picture transmission system and a moving picture transmission apparatus used in the system and, more particularly, to a moving picture transmission system for hierarchically coding a moving picture in accordance with the degrees of importance in terms of image quality and transmitting the codes and a moving picture transmission apparatus used in the system.

Hierarchical coding of a moving picture is a coding technique of compressing/coding the moving picture information by dividing the information into blocks in accordance with the degrees of importance in terms of image quality. In the respective moving picture frames constituting moving picture information, energy concentrates at a portion with a low two-dimensional spatial frequency. This portion is significant in terms of image quality.

A scheme of extracting a plurality of pieces of information with different frequency components from each moving picture frame by recursively dividing each moving picture frame in terms of frequency is called sub-band coding.

Japanese Patent Laid-Open No. 8-46960 discloses a coding apparatus for transmitting a multi-resolution moving picture in a multi-speed, multi-format mode by differently coding the respective sub-bands obtained by band division in this scheme, and multiplexing the coding results. Japanese Patent Laid-Open No. 6-339130 discloses a moving picture transmission scheme of ensuring minimum image quality by performing error correction and transmission through two different paths.

According to another typical example of hierarchical coding, in a scheme of dividing a moving picture frame into blocks, performing discrete cosine transform (DCT) in each block, and quantizing the results, each block obtained by DCT is divided into a low-frequency range and a high-frequency range, and the low- and high-frequency ranges of the respective blocks are collected to hierarchically express the moving picture frame. Another method is also available, in which each moving picture frame is hierarchically expressed by using coarsely quantized DCT coefficients and the results obtained by finely quantizing the differences between the original DCT coefficients and the coarsely quantized coefficients.

Japanese Patent Laid-Open No. 2-113748 discloses a scheme of suppressing fluctuations in image quality by dynamically changing the ratio between low-frequency ranges, i.e., most significant parts (MSP), and high-frequency ranges, i.e., least significant parts (LSP) while detecting the congestion of a network in a moving picture transmission system for dividing each DCT block into two blocks, and transmitting them while assigning priorities to the blocks in discarding them in accordance with the congestion of packets in the network.

In addition, Japanese Patent Laid-Open No. 4-100494 discloses a scheme of determining the division of MSP and LSP for each block while estimating influences on image quality, i.e., determining such that pictures to be reproduced from LSP have constant image quality.

These techniques use the following characteristics of moving picture information coded by hierarchical coding. When at least MSP is received at a reception terminal, a moving picture with a certain degree of image quality can be reproduced. When both MSP and LSP are received, a moving picture with high image quality can be reproduced. In addition, the above techniques are used to realize moving picture transmission services with different qualities by using a single bit string or moving picture transmission through a network in which packets may be discarded due to congestion.

The following two problems are posed in the above conventional techniques. In a network such as an Ethernet widely used in offices and the like, when the network is congested, all hierarchical codes cannot be transmitted within a moving picture frame period, and the moving picture frame reception time at a reception terminal becomes longer than the actual frame period. Such prolongation of reception time keeps increasing as long as the congestion of the network continues. As a result, the number of frames to be reproduced per unit time decreases. This prolongs the time required to reproduce moving picture information, affecting the subjective image quality.

Furthermore, in the above schemes, even if the network congestion is settled, the discarded hierarchical codes are not received by the reception terminal. For this reason, no improvement in image quality can be expected even if the network congestion is settled.

To solve these problems, a large memory may be mounted in the reception terminal to allow the reception terminal to start reproduction upon receiving all pieces of moving picture information. In this case, however, long delays occur. This technique cannot therefore be used for real-time communication. In addition, even in a service for which real-time performance is not directly required as in a service of retrieving data from a moving picture database, the user of a reception terminal has to wait for a long period of time, and the reception terminal demands a large memory capacity.

SUMMARY OF THE INVENTION

It is an object of the present invention to provide a moving picture transmission system which improves the subjective image quality of a moving picture reproduced in a reception terminal even in network congestion while maintaining a certain degree of real-time performance, and a moving picture transmission apparatus used in the system.

It is another object of the present invention to provide a moving picture transmission system which improves the quality of a moving picture transmission service in a network such as an Ethernet in which variations in throughput and delays occur depending on how terminals connected to the network are using the network, and a moving picture transmission apparatus used in the system.

In order to achieve the above objects, according to the present invention, there is provided a moving picture transmission system comprising a transmission apparatus for transmitting a maximum number of pieces of information obtained by hierarchically coding moving picture information in accordance with degrees of importance in terms of image quality within a moving picture frame period in the order of decreasing degrees of importance, and a reception apparatus for reproducing a moving picture frame in accordance with only hierarchically coded information received at a moving picture frame period.

DESCRIPTION OF THE PREFERRED EMBODIMENTS

The present invention will be described in detail below with reference to the accompanying drawings.

Figure 1:
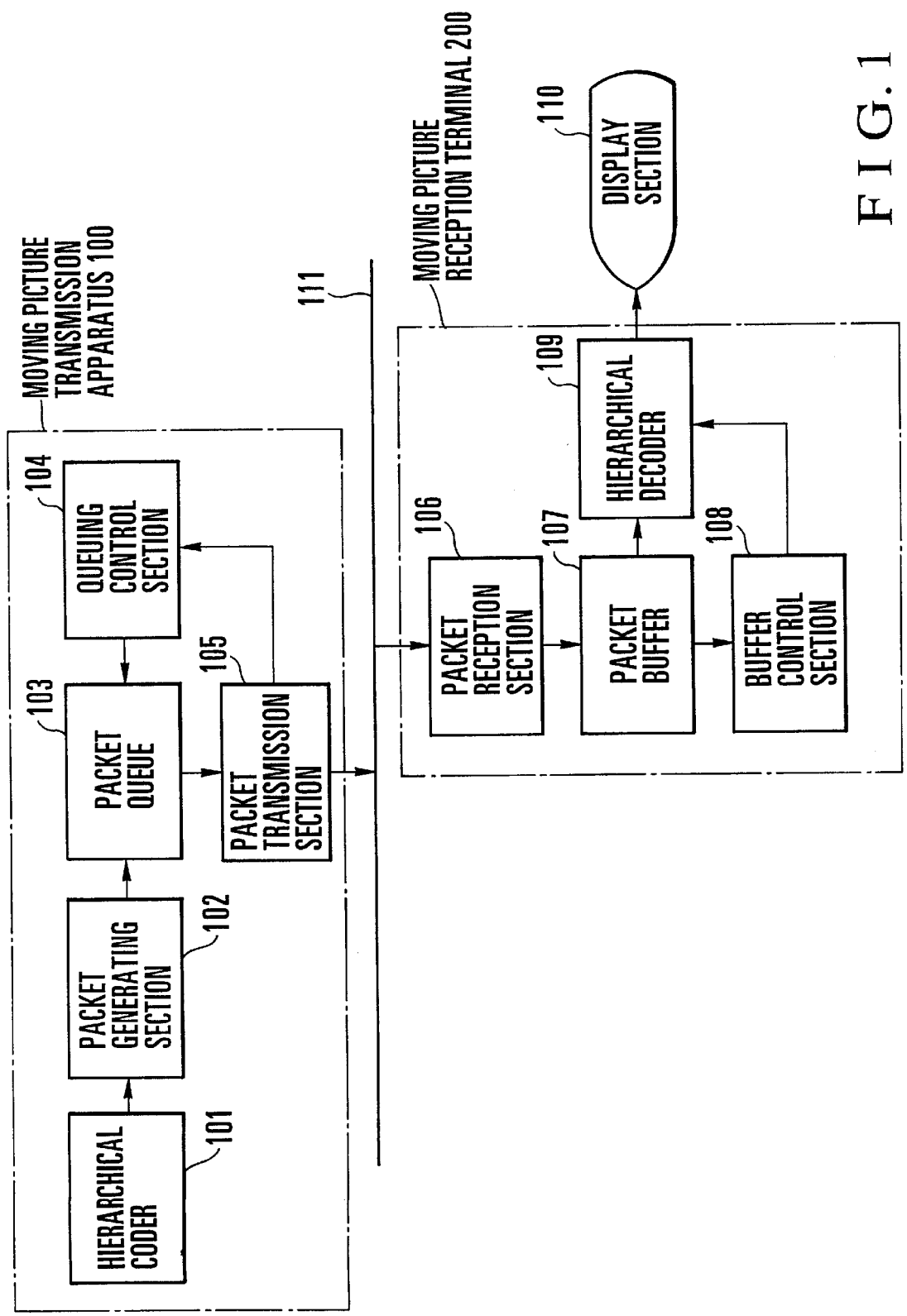
FIG. 1 is a block diagram showing a moving picture transmission system according to the first embodiment of the present invention.

FIG. 1 shows a moving picture transmission system according to the first embodiment of the present invention. Referring to FIG. 1, a moving picture transmission apparatus 100 is constituted by a hierarchical coder 101 for outputting a hierarchical moving picture signal, a packet generating section 102 for packeting the hierarchically coded information output from the hierarchical coder 101, a packet queue 103 for sequentially storing the packets output from the packet generating section 102, a queuing control section 104 for performing control to, for example, input, rearrange, and discard the packets stored in the packet queue 103, and a packet transmission section 105 for sequentially transmitting the packets stored in the packet queue 103 to a network 111 and notifying the queuing control section 104 of the transmission of the packets.

The hierarchical coder 101 is a real-time moving picture coding unit or a moving picture database storing hierarchically coded moving picture information in advance. The hierarchical coder 101 outputs the result obtained by hierarchically coding a moving picture frame at a moving picture frame period.

The packet generating section 102 generates packets in accordance with the respective hierarchical codes of the moving picture frame output from the hierarchical coder 101. The respective hierarchical codes of the moving picture frame are stored in one or a plurality of packets. The generated packets are stored in the packet queue 103 under the control of the queuing control section 104. The packet transmission section 105 sequentially transmits the packets at the moving picture frame period, starting from the first packet in the packet queue 103.

The packet transmission section 105 notifies the queuing control section 104 of information indicating the specific packets which could be transmitted within the moving picture frame period. The queuing control section 104 performs control to discard and rearrange the packets in the packet queue 103 as well as control to input packets from the packet generating section 102 to the packet queue 103.

A moving picture reception terminal 200 is constituted by a packet reception section 106 for receiving packets traveling through the network 111, a packet buffer 107 for temporarily storing the packets received by the packet reception section 106, a buffer control section 108 for managing the packets stored in the packet buffer 107, and a hierarchical decoder 109 for hierarchically decoding the packets stored in the packet buffer 107.

The packet reception section 106 receives packets from the network 111 and inputs them to the packet buffer 107.

The buffer control section 108 manages information indicating the specific levels of the specific moving picture frames to which the packets stored in the packet buffer 107 belong.

The hierarchical decoder 109 receives the packets designated by the buffer control section 108 from the packet buffer 107 at a moving picture frame period, and reproduces a moving picture frame in accordance with the number of the levels of the input packets. The moving picture frame reproduced by the hierarchical decoder 109 is displayed on a display section 110.

Preconditions for the operation of the packet transmission section 105 in the moving picture transmission apparatus 100 will be described below. The packet transmission section 105 sequentially reads out packets from the packet queue 103 and outputs them to the network 111. In this case, the respective packets are output on the following preconditions:

I. The packets should be output in the order in which they are read out.

II. The packets should be received by a moving picture reception terminal without any error in the order in which they are read out.

III. A specific packet up to which the output packets have been properly received can be determined.

Note that the precondition III is not always required in the moving picture transmission system of this embodiment.

Assume that the network 111 is an Ethernet. In this case, upon detecting a collision between a packet and information transmitted from another terminal on the network 111, the packet transmission section 105 retransmits the packet. That is, the output packet is transmitted to the moving picture reception terminal 200 after the network 111 becomes available. Upon completion of this transmission, the packet transmission section 105 receives the next packet from the packet queue 103 and transmits it.

If a highly reliable protocol such as TCP/IP (Transmission Control Protocol/Internet Protocol) is used, all the preconditions I, II, and III are guaranteed. When the network 111 is an ATM (Asynchronous Transfer Mode) network as well, the preconditions can be satisfied by using TCP/IP with proper operation parameters. Although various schemes for the preconditions I, II, and III may be examined, the above examples will suffice.

Figure 2:
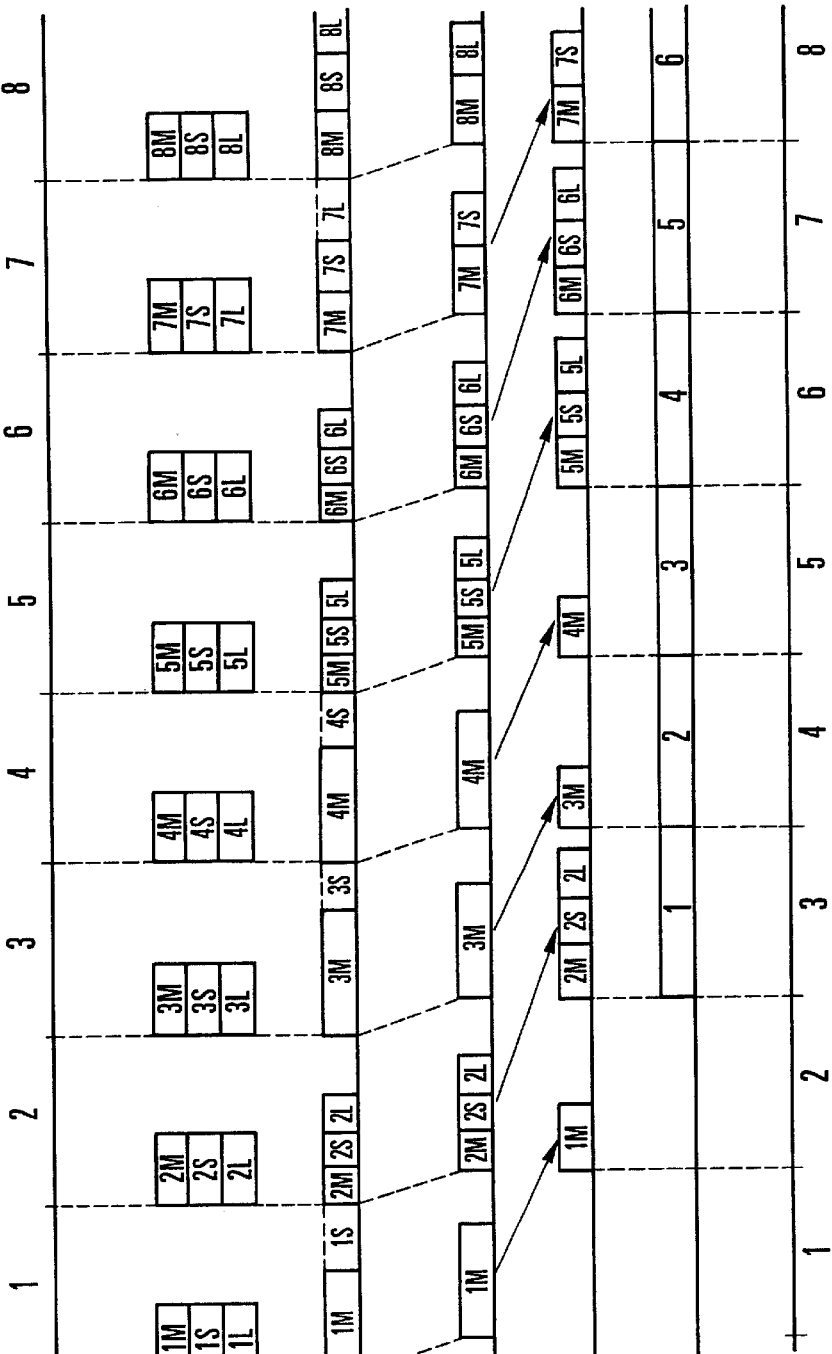
FIGS. 2A to 2G are timing charts showing the operation of the system in FIG. 1.

FIGS. 2A to 2G explain the operation of the moving picture transmission system in FIG. 1. As shown in FIG. 2A, the moving picture transmission apparatus 100 operates in synchronism with a moving picture frame period. The hierarchical coder 101 generates hierarchical codes at the moving picture frame period, and inputs them to the packet generating section 102.

In this embodiment, each moving picture frame is divided into parts of three levels to be coded. The parts of the respective levels will be referred to as M (Most Significant Parts), S (Significant Parts), and L (Least Significant Parts). By combining M, S, and L with moving picture frame numbers 1, 2, 3, . . . , moving picture frame 1 is divided into 1M, 1S, and 1L, and moving picture frame 2 is divided into 2M, 2S, and 2L.

The packet generating section 102 stores each hierarchical part of the codes in one packet. That is, each of 1M, 1S, 1L, 2M, 2S, 2L, . . . forms one packet. As shown in FIG. 2B, the packet generating section 102 inputs three packets corresponding to one moving picture frame, e.g., 1M, 1S, and 1L, to the packet queue 103 at the start of a moving picture frame period. In this case, the input order of packets to the packet queue 103 is controlled by the queuing control section 104 such that 1M is input first; 1S, second; and 1L, last.

The packet transmission section 105 reads out the packets prepared in the packet queue 103 at the start of a moving picture frame period in the order in which they are queued, and outputs them to the network 111. The transmission of packets from the packet transmission section 105 depends on the congestion of the network 111. The packet transmission section 105 interrupts the transmission of packets at the end of each moving picture frame period even in the process of transmission.

The queuing control section 104 discards the contents of the packet queue 103, i.e., the packets which are not transmitted, at the end of the moving picture frame period. The packet generating section 102 generates packets from the hierarchical codes of the next moving picture frame at the start of a moving picture frame period, and inputs the packets to the packet queue 103. As shown in FIG. 2C, the moving picture transmission apparatus 100 transmits hierarchical code packets having a one-level hierarchy (1M), a three-level hierarchy (2M, 2S, and 2L), a one-level hierarchy (3M), a one-level hierarchy (4M), a three-level hierarchy (5M, 5S, 5L), a three-level hierarchy (6M, 6S, 6L), a two-level hierarchy (7M, 7S), and a two-level hierarchy (8M, 8S) in moving picture frame periods 1 to 8, respectively.

As shown in FIGS. 2D and 2G, in the moving picture reception terminal 200, hierarchical code packets are received by the packet reception section 106 at each moving picture frame period in the reception terminal, and input to the packet buffer 107. The buffer control section 108 monitors the hierarchical code packets received in a moving picture frame period, and outputs the packets received in the moving picture frame period from the packet buffer 107 to the hierarchical decoder 109 at the moving picture frame period, as shown in FIG. 2E. The hierarchical decoder 109 decodes the moving picture frame in accordance with the number of the levels of the input packets. The decoded moving picture frame is displayed on the display section 110 at the next moving picture frame period, as shown in FIG. 2F.

Figure 3:
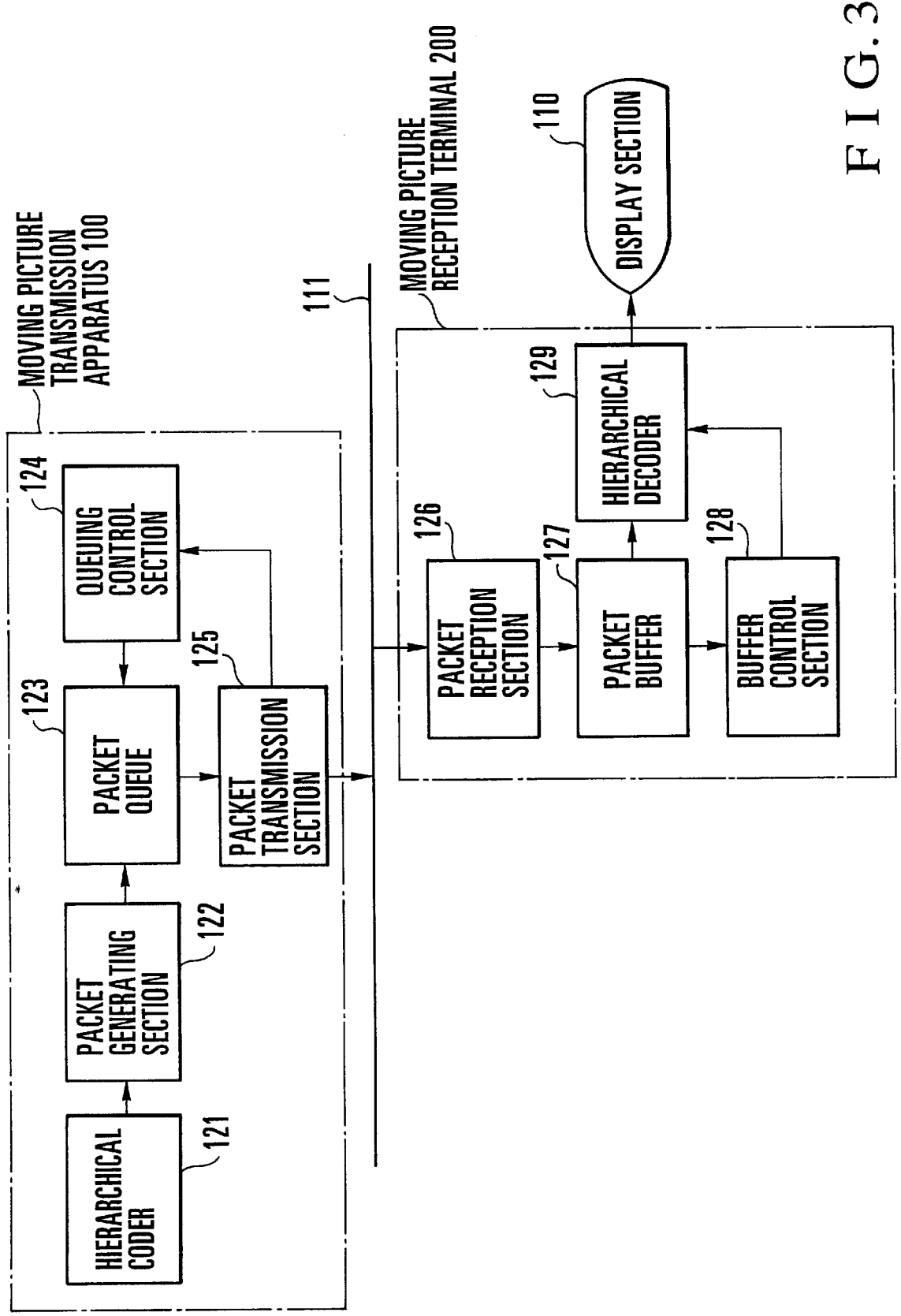
FIG. 3 is a block diagram showing a moving picture transmission system according to the second embodiment of the present invention.

FIG. 3 shows a moving picture transmission system according to the second embodiment of the present invention. In the second embodiment, the hierarchical packets which are not transmitted within a moving picture frame period are not discarded but held in the packet queue in the period of time determined by the degree of importance of each level.

Referring to FIG. 3, a moving picture transmission apparatus 120 is constituted by a hierarchical coder 121 for outputting a hierarchically coded moving picture signal, a packet generating section 122 for packeting the hierarchically coded information output from the hierarchical coder 121, a packet queue 123 for storing the packets output from the packet generating section 122 and the packets which are not transmitted while assigning priorities to them, a queuing control section 124 for performing input control on the packets stored in the packet queue 123 and performing priority control to rearrange and discard the packets, and a packet transmission section 125 for sequentially transmitting the packets stored in the packet queue 123 to a network 111.

A moving picture reception terminal 200 is constituted by a packet reception section 126 for receiving packets traveling through the network 111, a packet buffer 127 for storing the packets from the packet reception section 126 for a predetermined period, a buffer control section 128 for performing management of the packets stored in the packet buffer 127, including selection of the hierarchically coded information constituting one moving picture frame, and a hierarchical decoder 129 for reproducing the moving picture frame by hierarchically decoding the packets stored in the packet buffer 127.

FIGS. 4A to 4G show the operation of the moving picture transmission system in FIG. 3. In this embodiment, the S- and L-level packets which are not transmitted within a moving picture frame are not discarded but held for a maximum of a two-frame period and a maximum of a one-frame period, respectively.

Figure 4:
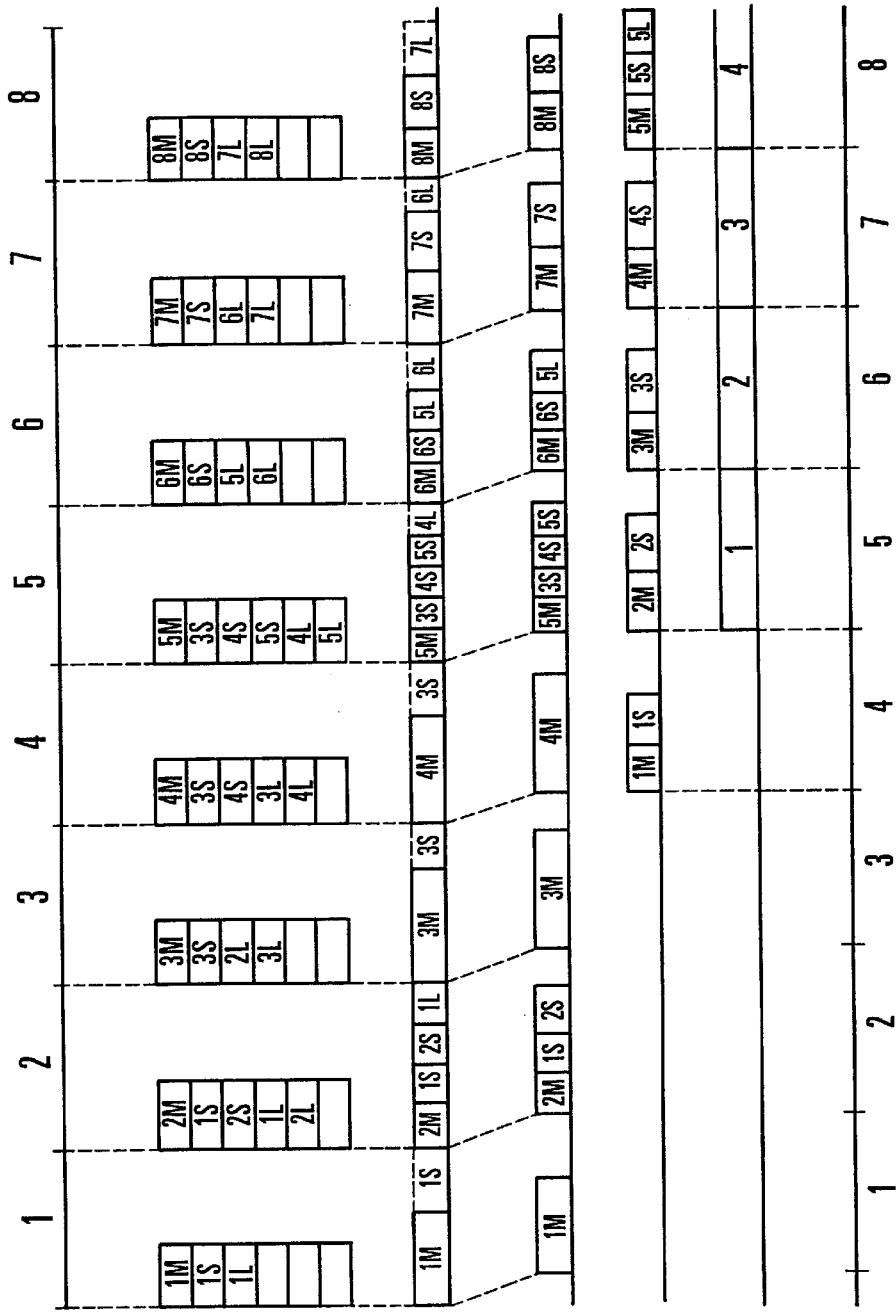
FIGS. 4A to 4G are timing charts showing the operation of the system in FIG. 3.

As shown in FIGS. 4A and 4C, in the moving picture transmission apparatus 100, the packet transmission section 125 transmits the packets stored in the packet queue 123 in a predetermined priority order at a moving picture frame period. At the end of a moving picture frame period, the packet transmission section 125 notifies the queuing control section 124 of the packets which are not transmitted within the frame period. As shown in FIG. 4B, the queuing control section 124 assigns priorities to the packets which are not transmitted and the new packets input from the packet generating section 122 to the packet queue 123, and stores the packets in the packet queue 123 in accordance with the priories. The following is an example of how priories are assigned.

nM>(n−2)S>(n−1)S>nS>(n−1)L>nL where (n−2), (n−1), and n are moving picture packet numbers. If the packets (n−2)M, (n−1)M, and (n−1)L have been transmitted, they are not queued in the packet queue 123. If other packets, e.g., (n−3)S and (n−2)L have not been transmitted but held, these packets are selectively discarded by the queuing control section 104.

To discard a packet indicates a lapse of the maximum hold time determined by the packet to be discarded. The packet queue 103 requires a capacity corresponding to six packets to cope with this operation, i.e., holding packets which are not transmitted.

The timing charts of FIGS. 4A to 4G are based on a network congestion state similar to that in the case shown in FIGS. 2A to 2G. That is, the number of packets to be transmitted within each moving picture frame period in the moving picture transmission apparatus is set to be the same as that in the case shown in FIGS. 2A to 2G.

As shown in FIG. 4D, in the moving picture reception terminal 200, the packet reception section 126 receives hierarchical code packets traveling through the network 111 and sequentially stores them in the packet buffer 127. The packets stored in the packet buffer 127 are hierarchically decoded by the hierarchical decoder 129. In this embodiment, since a packet corresponding to a given moving picture frame may be transmitted with a maximum of a two-frame delay, the decoding operation must be started with a delay as compared with the case shown in FIGS. 2A to 2G.

As shown in FIGS. 4G and 4E, in consideration of this delay, the buffer control section 128 inputs packets constituting a moving picture frame from the packet buffer 127 to the hierarchical decoder 129 after a lapse of a two-frame time after the first packet of the moving picture frame has arrived. The hierarchical decoder 129 hierarchically decodes hierarchical codes in accordance with the input packets, as shown in FIG. 4F.

The image quality of a moving picture in the second embodiment is better and stabler than that in the first embodiment. This is because, the number of packets to be decoded for each moving picture frame is larger and steadier.

The details of the hierarchical coders 101 and 121 and the hierarchical decoders 109 and 129 will be described. These are based on a moving picture coding scheme used for MPEG (Moving Picture imaging coding Experts Group) and are known, and hence will be briefly described below.

Figure 5:
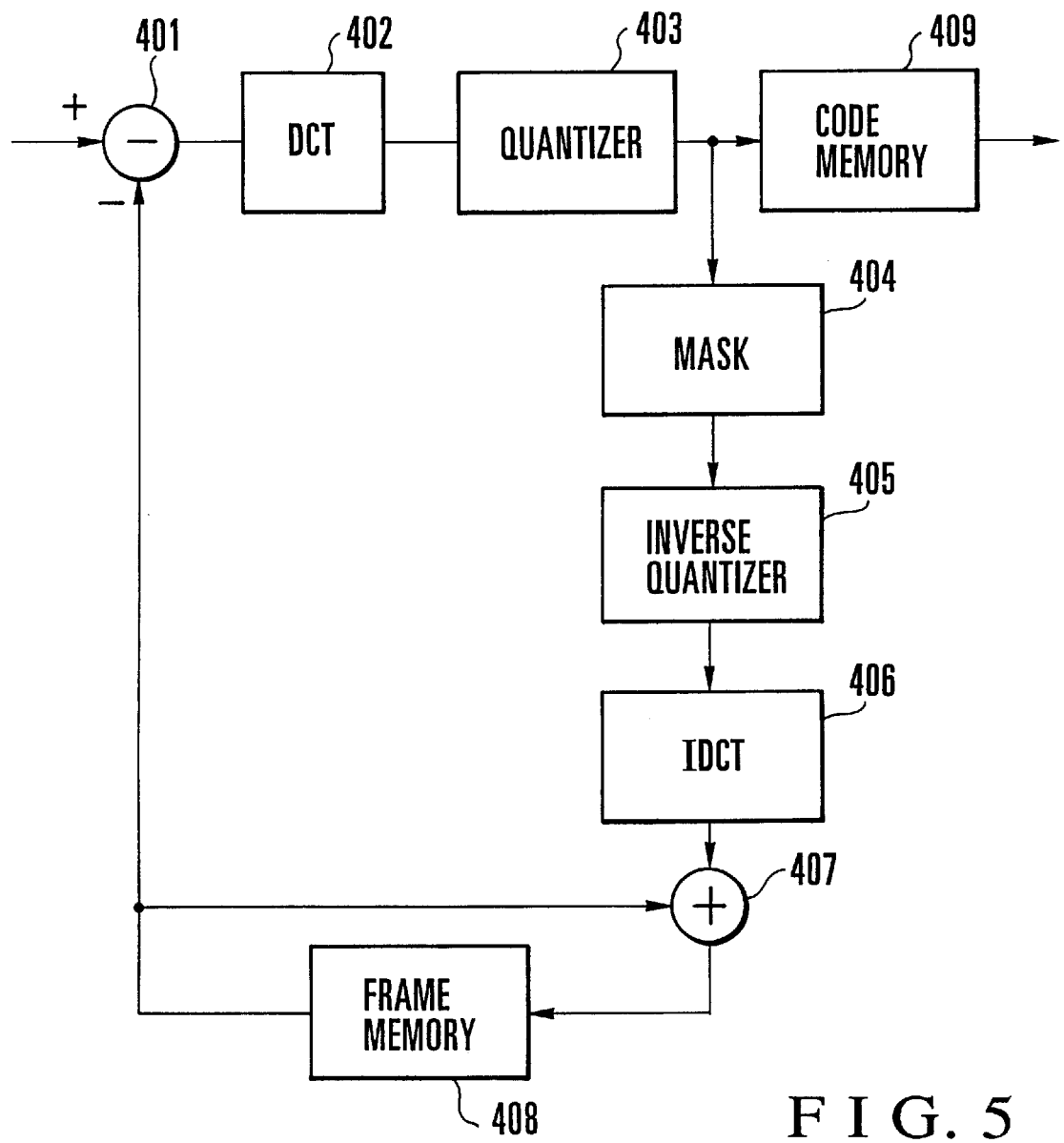
FIG. 5 is a block diagram showing a hierarchical coder in FIGS. 1 and 3.

FIG. 5 shows the arrangement of each of the hierarchical coders 101 and 121 in FIGS. 1 and 3. A moving picture frame is divided into blocks and input to this hierarchical coder in units of blocks. A block subtracter 401, a discrete cosine transform unit (DCT) 402, a quantizer 403, an inverse quantizer 405, an inverted discrete cosine transform unit (IDCT) 406, a block adder 407, and a frame memory 408 perform known moving picture coding operations.

Figure 6:
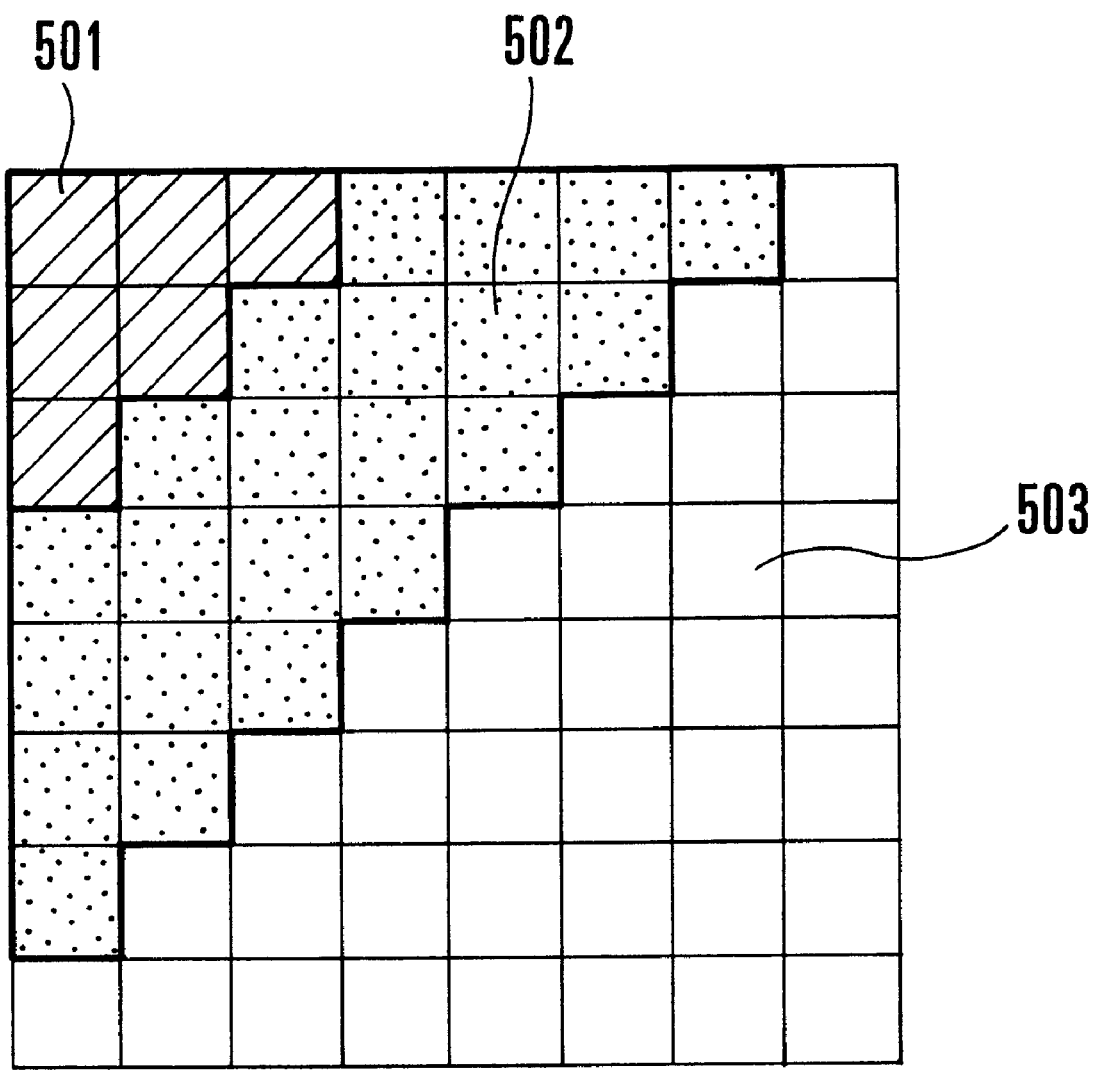
FIG. 6 is a view showing 8×8 DCT coefficient blocks stored in a code memory in FIG. 5.

In the hierarchical coder in FIG. 5, the 8×8 quantized DCT coefficient blocks shown in FIG. 6, i.e., outputs corresponding one moving picture frame from the quantizer 403, are stored in a code memory 409. Of the 8×8 DCT coefficient blocks in FIG. 6, the six coefficients in a hatched area 501 constitute level M, the 22 coefficients in a dotted area 502 constitute level S, and the 36 coefficients in the remaining area 503 constitute level L.

Each of the packet generating sections 102 and 122 in FIGS. 1 and 3 reads out the area 501 at once from all the DCT coefficient blocks stored in the code memory 409, and generates M packets for the moving picture frame. Similarly, each of the packet generating sections 102 and 122 generates S packets from the area 502 of all the DCT coefficient blocks; and L packets, from the area 503. At this time, each hierarchical data is generally coded by run length coding.

A mask 404 is used to generate a locally decoded signal from only the area 501 of the 8×8 DCT coefficient blocks shown in FIG. 6, while setting the areas 502 and 503 to 0.

Figure 7:
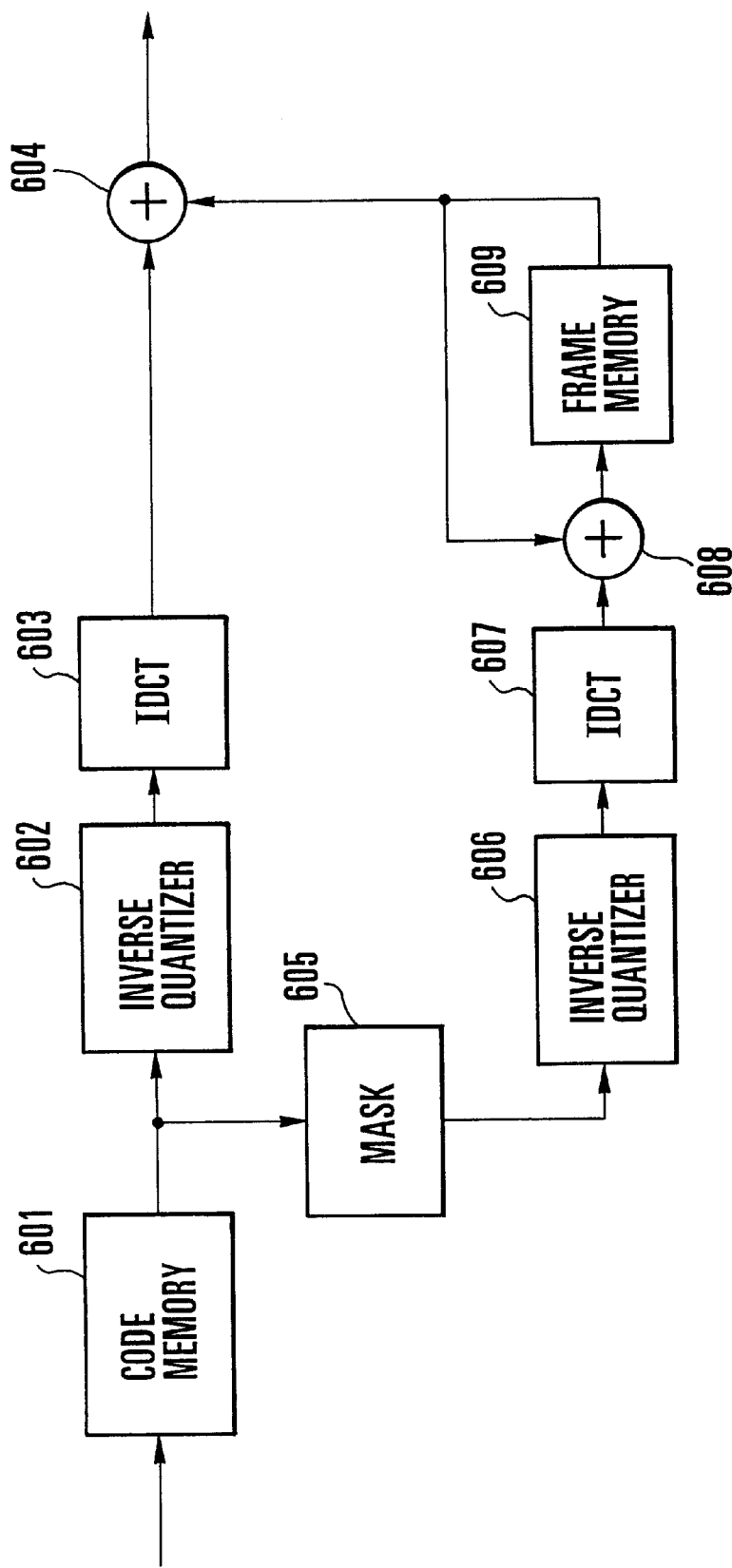
FIG. 7 is a block diagram showing a hierarchical decoder in FIGS. 1 and 3.

FIG. 7 shows the arrangement of each of the hierarchical decoders 109 and 129 in FIGS. 1 and 3. The packets input from the packet buffers 107 and 127 are rearranged in a code memory 601 such that the 8×8 DCT coefficient blocks are rearranged according to a format corresponding to the contents of the code memory 409 (FIG. 5). In this case, if run length coding is performed by the hierarchical coder, a function of decoding the coded information must be added.

In executing hierarchical decoding, since all the packets generated by the moving picture transmission apparatus 100 are not necessarily received, the moving picture reception terminal 200 sets all the DCT coefficients corresponding to hierarchical packets which are not received to 0, and executes the subsequent decoding operation. A mask 605 serves to set the coefficient portions corresponding to the areas 502 and 503 to 0 so as to reproduce a decoded signal on a frame memory 609 from only the coefficients of a portion corresponding to the area 501, in the DCT coefficient blocks in FIG. 5, by using an inverse quantizer 606, an inverted discrete cosine transform unit (IDCT) 607, and a block adder 608.

The moving picture frame to be actually displayed can be obtained when an adder 604 adds the inter-frame difference signal reproduced by the IDCT 603 to the M-level moving picture frame as the previous frame stored in the frame memory 609 without using the mask 605.

As has been described above, according to the present invention, the moving picture transmission apparatus packets hierarchical codes corresponding to one moving picture frame at a moving picture frame period, and stores the packets in the packet buffer. In transmitting the packets, the apparatus discards the packets which cannot be transmitted within each moving picture frame period. The moving picture reception terminal reproduces a moving picture frame from only the packets received within each moving picture frame period. Even when the network is congested, this arrangement can prevent packets from remaining in the moving picture transmission apparatus, and can perform moving picture transmission and reproduction in synchronism with a moving picture frame period.

In addition, in the moving picture transmission apparatus, a packet which has not been transmitted to the reception terminal within a moving picture frame period is kept in the packet buffer in the moving picture transmission apparatus for the next moving picture frame period or the two subsequent periods depending on the degree of importance, and is transmitted after the congestion of the network is settled. With this operation, even in short-period network congestion, moving pictures with stable image quality can be transmitted and reproduced.

What is claimed is:

1. A moving picture transmission system comprising:
   a transmission apparatus for transmitting a maximum number of pieces of information obtained by hierarchically coding moving picture information in accordance with degrees of importance in terms of image quality within a moving picture frame period in the order of decreasing degrees of importance, wherein said transmission apparatus transmits hierarchically coded information, which could not be transmitted within a moving picture frame period, within at least one subsequent moving picture frame period, said transmission apparatus comprising,
      hierarchical coding means for hierarchically coding moving picture information in accordance with degrees of importance in terms of image quality;
      packet generating means for packeting, in units of levels, the hierarchically coded information output from said hierarchical coding means;
      first packet storage means for storing packets of the respective levels, output from said packet generating means, in a predetermined priority order;
      packet transmission means for sequentially reading out and transmitting the packets stored in said first packet storage means at the moving picture frame period; and
      control means for, when not all packets are transmitted within a moving picture frame period, rearranging packets to be transmitted in at least one subsequent moving picture frame period, including a packet which has not been transmitted, in said first packet storage means in the predetermined priority order, wherein the predetermined priority order is determined on the basis of at least one of a hierarchical order and a hold time of each packet in said first packet storage means; and
   a reception apparatus for reproducing a moving picture frame in accordance with only hierarchically coded information received at a moving picture frame period, wherein said reception apparatus is operative to select pieces of hierarchically coded information constituting a moving picture frame to be reproduced from hierarchically coded information received in a plurality of consecutive moving picture frame periods, and decodes the pieces of hierarchically coded information, thereby reproducing the moving picture frame.

2. A moving picture transmission system comprising:
   a transmission apparatus for transmitting a maximum number of pieces of information obtained by hierarchically coding moving picture information in accordance with degrees of importance in terms of image quality within a moving picture frame period in the order of decreasing degrees of importance, wherein said transmission apparatus transmits hierarchically coded information, which could not be transmitted within a moving picture frame period, within at least one subsequent moving picture frame period, said transmission apparatus comprising, hierarchical coding means for hierarchically coding moving picture information in accordance with degrees of importance in terms of image quality;

packet generating means for packeting, in units of levels, the hierarchically coded information output from said hierarchical coding means;

first packet storage means for storing packets of the respective levels, output from said packet generating means, in a predetermined priority order;

packet transmission means for sequentially reading out and transmitting the packets stored in said first packet storage means at the moving picture frame period; and control means for, when not all packets are transmitted within a moving picture frame period, rearranging packets to be transmitted in at least one subsequent moving picture frame period, including a packet which has not been transmitted, in said first packet storage means in the predetermined priority order, wherein when a packet stored in said first packet storage means is not transmitted within a hold period corresponding to a predtermined maximum number of moving picture frame periods which is determined in advance for each level and in which the packet can be stored, said control means discards the packet which is held after a lapse of the hold period; and a reception apparatus for reproducing a moving picture frame in accordance with only hierarchically coded information received at a moving picture frame period, wherein said reception apparatus is operative to select pieces of hierarchically coded information constituting a moving picture frame to be reproduced from hierarchically coded information received in a plurality of consecutive moving picture frame periods, and decodes the pieces of hierarchically coded information, thereby reproducing the moving picture frame.

3. A system according to claim 2, wherein said hierarchical coding means codes moving picture information into codes of first to third levels in the order of degrees of importance, and said control means performs control to hold the hierarchically coded information of the second level for a maximum of a period corresponding to two moving picture frames and hold the hierarchically coded information of the third level for a maximum of a period corresponding to one moving picture frame.

4. A system according to claim 1, wherein said transmission apparatus comprises:

hierarchical coding means for hierarchically coding moving picture information in accordance with degrees of importance in terms of image quality;

packet generating means for packeting, in units of levels, the hierarchically coded information output from said hierarchical coding means;

first packet storage means for storing packets of the respective levels, output from said packet generating means, in the order of decreasing degrees of importance;

packet transmission means for sequentially reading out and transmitting the packets stored in said first packet storage means at the moving picture frame period; and control means for, when not all packets are transmitted within a moving picture frame period, discarding a packet which has not need transmitted and ha a low degree of importance at the end of the moving picture frame period.

5. A system according to claim 2, wherein said reception apparatus comprises:

second packet storage means for receiving a packet from said transmission apparatus and holding the packet for a period of time corresponding a predetermined number of moving picture frame periods;

decoding control means for selecting packets containing pieces of hierarchically coded information constituting the same moving picture frame from packets stored in said second packet storage mean; and decoding means for decoding a moving picture in accordance with a level of hierarchically coded information of each packet selected by said decoding control means.

* * * * *